(12) United States Patent
Yoshimura et al.

(10) Patent No.: US 12,391,334 B1
(45) Date of Patent: Aug. 19, 2025

(54) BICYCLE PEDAL

(71) Applicants: Yusaku Yoshimura, Chino, CA (US); Collin Timmermans, Chino, CA (US)

(72) Inventors: Yusaku Yoshimura, Chino, CA (US); Collin Timmermans, Chino, CA (US)

(73) Assignee: Yoshimura, Chino, CA (US)

( * ) Notice: Subject to any disclaimer, the term of this patent is extended or adjusted under 35 U.S.C. 154(b) by 0 days.

(21) Appl. No.: 18/435,920

(22) Filed: Feb. 7, 2024

(51) Int. Cl.
*B62M 3/08* (2006.01)

(52) U.S. Cl.
CPC ................... *B62M 3/08* (2013.01)

(58) Field of Classification Search
CPC ............... B62M 3/08; B62M 3/086
USPC ....................................... 74/594.4
See application file for complete search history.

(56) References Cited

U.S. PATENT DOCUMENTS

| | | | |
|---|---|---|---|
| 623,399 A * | 4/1899 | Germaine | B62M 3/08 74/594.4 |
| 1,276,139 A | 8/1918 | Warner | |
| 2,625,448 A * | 1/1953 | Underwood | F16C 33/1065 384/291 |
| 4,338,829 A | 7/1982 | Ozaki | |
| 5,852,956 A | 12/1998 | Chen | |
| 5,916,332 A | 6/1999 | Chen | |
| 6,085,614 A | 7/2000 | Lin | |
| 8,061,236 B2 | 11/2011 | French | |
| 8,714,052 B2 | 5/2014 | Chamberlain | |
| 10,875,600 B1 * | 12/2020 | Lopez | B62M 3/08 |
| 11,242,113 B2 | 2/2022 | Gatto | |
| 11,858,587 B2 | 1/2024 | Inoue | |
| 2007/0076992 A1 * | 4/2007 | Hong | F16C 17/107 384/119 |
| 2010/0064846 A1 * | 3/2010 | Tsai | B62M 3/08 74/594.4 |
| 2011/0283565 A1 * | 11/2011 | Hunter | B62M 3/086 36/131 |
| 2012/0266718 A1 | 10/2012 | Yang | |
| 2012/0291590 A1 * | 11/2012 | Chamberlain | B62M 3/08 74/594.6 |
| 2014/0251078 A1 * | 9/2014 | Emerson | B62M 3/086 74/594.6 |
| 2023/0271674 A1 | 8/2023 | Belknap et al. | |

FOREIGN PATENT DOCUMENTS

| | | | | |
|---|---|---|---|---|
| DE | 202011102588 U1 * | 1/2012 | ............. | B62M 3/08 |
| TW | M481864 U * | 7/2014 | ............. | B52M 3/08 |

OTHER PUBLICATIONS

Translation of TW M481864 U, Pai, Jul. 11, 2014 (Year: 2014).*

* cited by examiner

*Primary Examiner* — Daniel D Yabut
(74) *Attorney, Agent, or Firm* — Kirk A. Buhler; Buhler & Associates Patenting

(57) ABSTRACT

Improvements in a bicycle pedal that uses a compression spring placed along the spindle of the pedal to maintain position of the pedal on the spindle and allow for tolerance and assembly variation. The spring ensures proper loading on the bearings and allows for tolerance build-up of the pedal and bearings to eliminate binding. The play is eliminated as the spring biases out the maximum and minimum tolerance of the parts used in the pedal. The design uses an elastomeric seal at the crank connection side. The seal allows the shaft to be pressed into the pedal and through one or a plurality of bearings where it can be secured with the fastener under the spring tension.

20 Claims, 4 Drawing Sheets

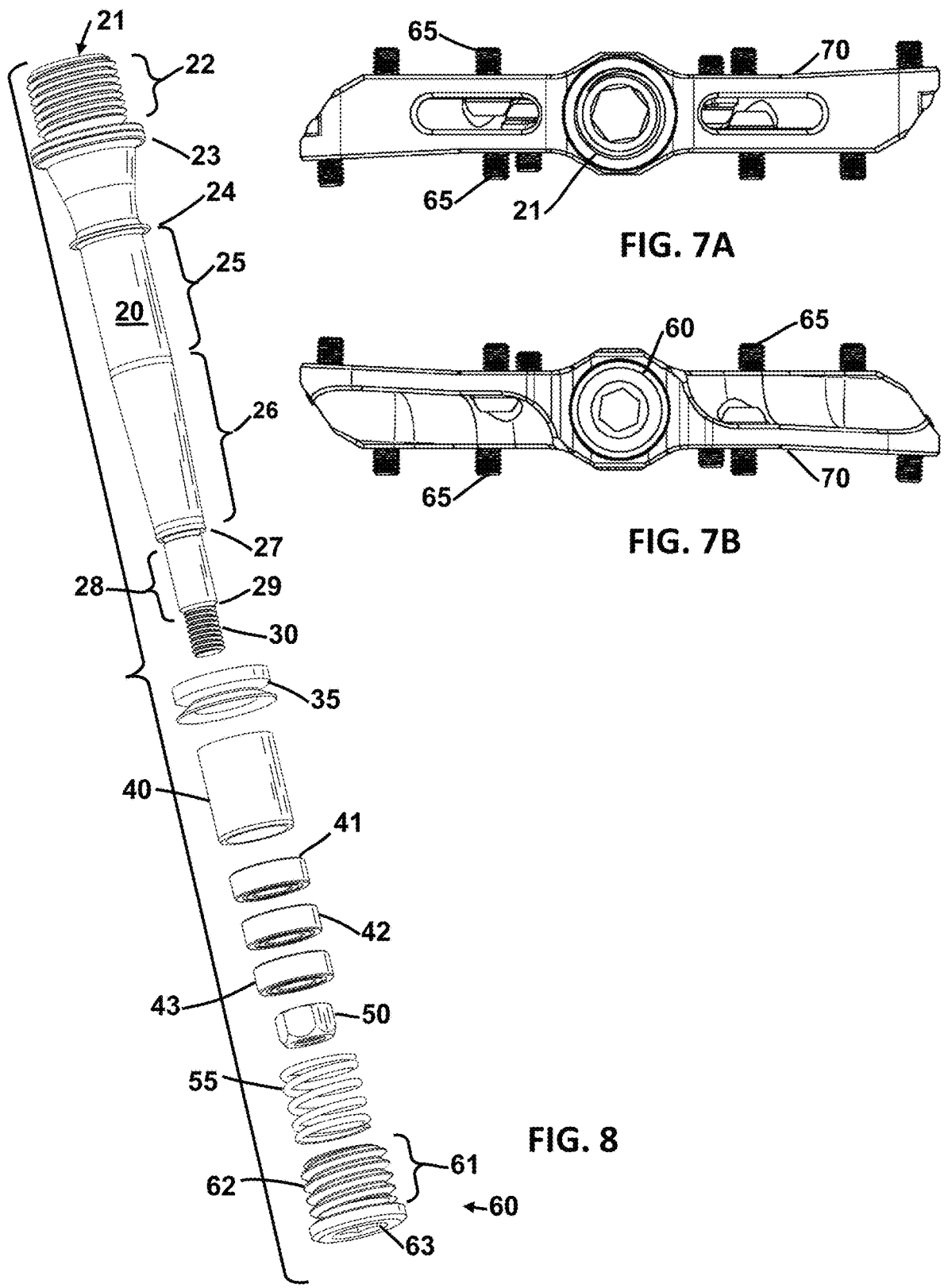

BICYCLE PEDAL

CROSS-REFERENCE TO RELATED APPLICATIONS

Not Applicable

PRIOR ART

U.S. Pat. No. 11,858,587 issued on Jan. 2, 2024, to Akira Inoue and is titled Bicycle Pedal. This patent discloses a bicycle pedal is provided with a pedal shaft and a pedal body. The pedal shaft has a first end portion configured to attach to a bicycle crank, a second end portion on an opposite side of the first end portion in an axial direction with respect to a rotational center axis of the pedal shaft, and a contact portion between the first end portion and the second end portion. The pedal body has a body part rotatably supported by the pedal shaft and a load receiving part at a position corresponding to the contact portion of the pedal shaft. The load receiving part receives a load from the contact portion of the pedal shaft. The load receiving part is at least partly spaced from the contact portion under a no-load condition and contacts the contact portion upon a load applied to the pedal body from a rider. While this pedal allows for some movement, the movement is from forced placed on the pedal as opposed to along the axis of shaft rotation.

U.S. Pat. No. 11,242,113 issued on Feb. 8, 2022, to Jeff Gatto and it titled Child's Riding Bike That Converts Between a Balance Bike and a Pedal-Powered Bicycle. This patent discloses a child's riding vehicle can be quickly reconfigured between a balance bike configuration and a pedal-powered bicycle configuration, suitable for children of different ages, without removing any parts to be stored separately. The pedal crank arms can be repositioned on the crank and the pedal axles can be pivoted so that in the balance bike configuration: the pedal crank arms are positioned adjacent to one another and generally upward; the pedal axles are pointed mostly rearwardly but also slightly inwardly rather than extending transversely side-to-side; and the crank arms and pedal axles are telescoped in. The result is that in the balance bike configuration the pedals and crank arms are compacted and folded out of the way so as not to interfere with the child riding the vehicle. While this pedal allows for some axial displacement of the pedal to the shaft, it is for removal or replacement of the pedal.

U.S. Pat. No. 4,338,829 issued on Jul. 13, 1982, to Nobuo Ozaki and is titled Bicycle Pedal. This patent discloses a bicycle pedal comprises a pedal spindle rotatably supporting a pedal body, at least one spring member being engaged with the pedal body to absorb shocks caused by axial impact forces imparted to the pedal. While this patent has springs on the pedal, they are for absorbing axial shock.

U.S. Pat. No. 1,276,139 issued on Aug. 20, 1918, to F. D. Warner and is titled Pedal for Cycles. This patent discloses a pedal connected to the shaft with an axial spring. The spring allows for the pedal to be rotated onto the crank and is not to maintain a load on the bearings of the shaft.

What is needed is a bicycle pedal that allows limited axial movement of the pedal against the bearings to prevent binding of the bearing based upon weather, normal loads, contamination or extreme longevity. The bicycle pedal disclosed in this document provides the solution.

BACKGROUND OF THE INVENTION

Bicycling is a popular sport, and many people use bicycles for transportation. The movement of the bicycle is from a user pressing down on the pedals in circular reciprocal motion. The pedals turn a crank that transfers power through a chain to a wheel. The pedals are connected on one side of the crank and must undergo high levels of normal forces as they rotate to produce rotational work onto the crank. Within the pedal are bearings or a bearing surface that where the pedal surface remains horizonal as they are pressed and returned while the inner shaft or shank rotates. To reduce axial play of the pedal surface to the shaft bearings must be accurately located. Because bicycle pedals protrude from the sides of a bicycle they can be exposed to impacts from obstacles and the ground in case of crashes.

SUMMARY OF THE INVENTION

It is an object of the bicycle pedal to be compatible with a bicycle crank. This connection is with a threaded shaft on the pedal that threads into a threaded hole in the crank. The orientation of the shaft is fixed on the crank and can be interchanged or can be installed as a replacement pedal.

It is an object of the bicycle pedal to use a spring that is coaxially placed on the pedal shaft to maintain the position of the pedal on the shaft. This ensures proper loading on the bearings and allows for tolerance build-up of the pedal and bearings to eliminate binding caused by dimensional variations of the assembly of the pedal from both manufacturing and assembly.

It is another object of the bicycle pedal to have limited axial play of the pedal on the shaft. The play is determined based upon the maximum and minimum tolerance of the parts used in the pedal. The axial play can be zero to 0.100 inch. The spring biases the pedal towards the crank and provides little or no movement while pedaling the bicycle.

It is still another object of the bicycle pedal to utilize an elastomeric seal at the crank connection side. The seal allows the shaft to be pressed into the pedal and through one or a plurality of bearings where it can be secured with a fastener under spring tension. A cap in the opposing side pre-loads the spring and seals the pedal from the environment.

Various objects, features, aspects, and advantages of the present invention will become more apparent from the following detailed description of preferred embodiments of the invention, along with the accompanying drawings in which like numerals represent like components.

BRIEF DESCRIPTION OF DRAWINGS

FIG. 7A shows an outside view of the bicycle pedal.

FIG. 7B shows an inside view of the bicycle pedal.

FIG. 8 shows an exploded view of the internal shaft and the supporting components, excluding the outer bicycle pedal.

DETAILED DESCRIPTION OF THE INVENTION

Figure 1:
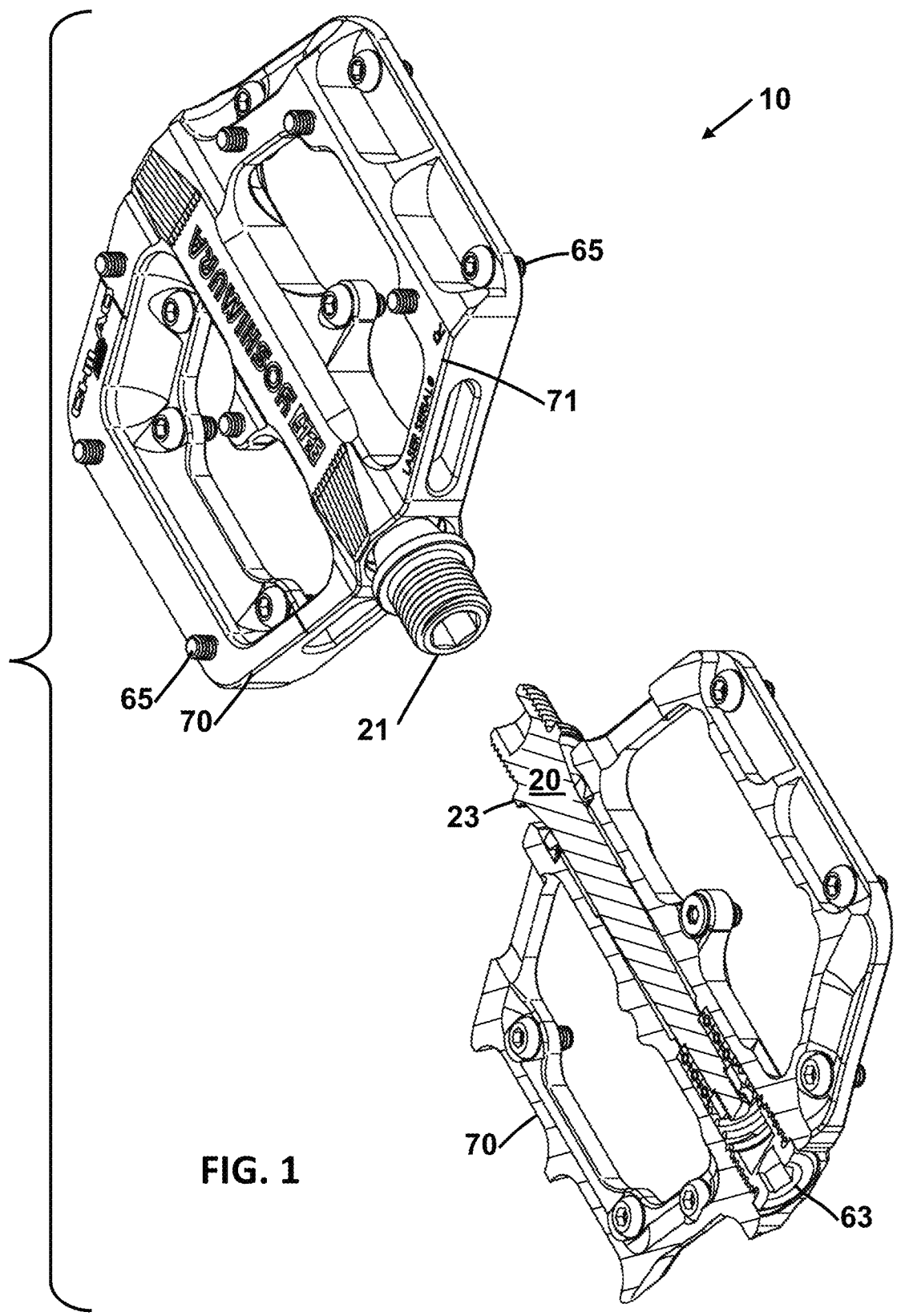
FIG. 1 shows one and one-half bicycle pedals.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

| Item Numbers and Description | |
| --- | --- |
| 10 pedal(s) | 15 prior art |
| 16 gap | 17 bearing spacer |
| 20 shaft/spindle | 21 hex socket |
| 22 threaded end | 23 flange |
| 24 flange | 25 bearing surface |
| 26 tapered shaft | 27 flange |
| 28 bearing surface | 29 shoulder |
| 30 threads | 35 elastomeric seal |
| 40 first bearing | 41 bearing |
| 42 bearing | 43 bearing |
| 50 nut | 55 spring |
| 60 threaded cap | 61 threaded area |
| 62 shoulder | 63 hex socket |
| | TB01-03Pd_Titractor.doc |
| 65 fastener | 65 fastener heads |
| 70 pedal | 71 indicia |
| 72 shoulder | 73 flange |

FIG. 1 shows one and one-half bicycle pedals 10. An indicium 71 on each pedal indicates if the pedal is for the left or right side of the bicycle. In this figure the indicia 71 in the upper pedal have an "R" for the right pedal 70. The lower pedal 70 is sectioned to show the interior structure that will be explained in more detail in other figures herein. Each pedal 70 is constructed with a plurality of fasteners 65 are threaded through the pedal 70 to form pins that grip onto the underside of shoes or bicycle shoes (not shown).

The inner side of each pedal 70 has a threaded portion with a hex socket 21. The hex socket 21 is used to tighten each pedal 70 on their respective crank arm on a bicycle. The pedal on the right side of a bicycle usually has a "right-handed" thread while the pedal on the left side of the bicycle has a "left-handed" thread. The direction of the threading is chosen so the pedal will not "unscrew" when the bicycle pedals are being turned in exercise. on the A shoulder or flange 23 provides a stop for threading or tightening the pedal shaft 20 into the crank arm. In the lower pedal 70 a hex socket 63 is located to seal the opposing end of the pedal 70 and also can be used to provide some tightening of the pedal 70.

Figure 2:
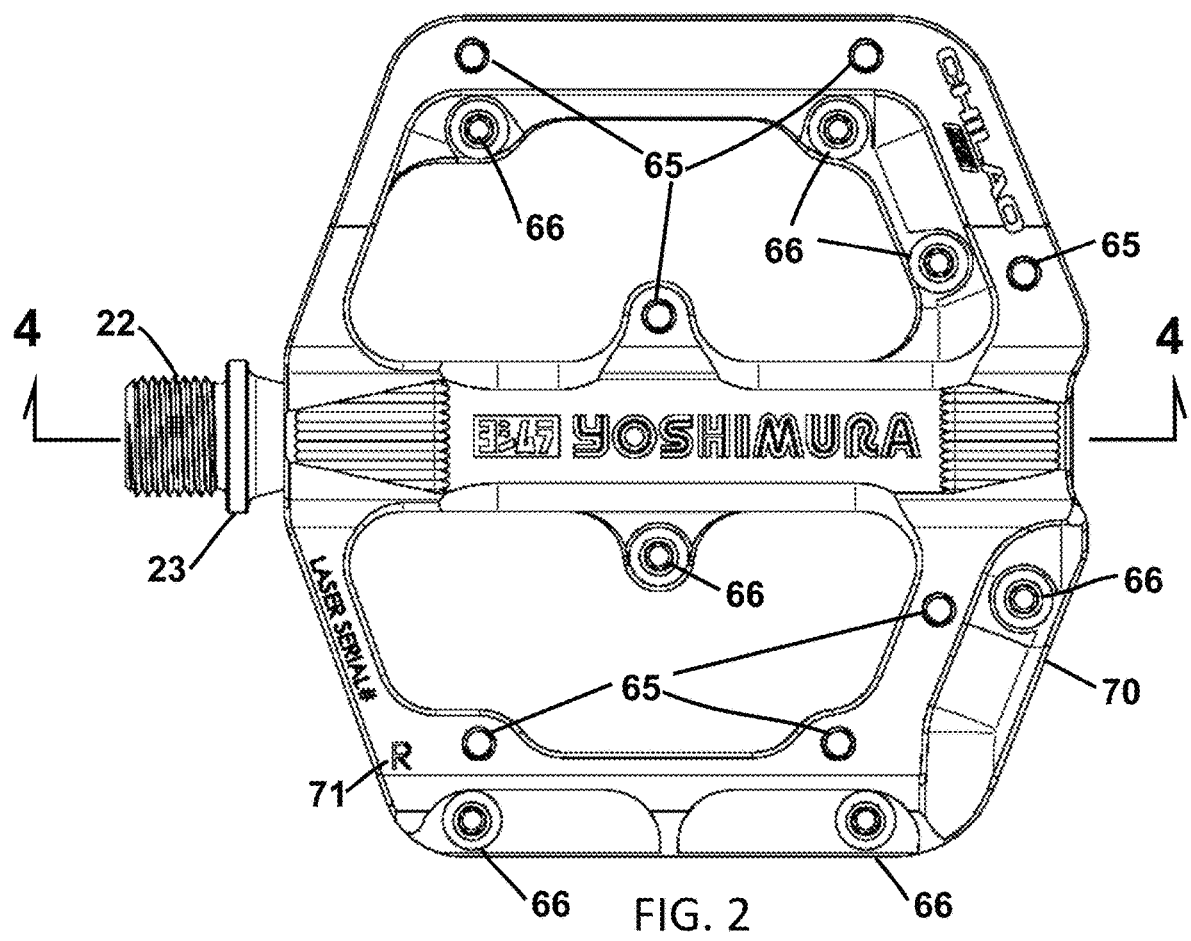
FIG. 2 shows a top plan view of the bicycle pedal.

FIG. 2 shows a top plan view of the bicycle pedal 70. This is the right pedal as identified by the "R" indicia 71. In proximity to the "R" indicia 71 each pedal 70 can be laser inscribed with a serial number to provide future tracking and identification of each pedal 70. The plurality of fasteners 65 are threaded through the pedal 70 to form pins that grip onto the underside of shoes or bicycle shoes (not shown). The top threaded portion of eight fasteners 65 are shown with the head of the eight fasteners 66 that would extend out the other side of the pedal 70 are shown in this view. On the left side of this view the threaded shaft 22 with the shoulder 23 that threads into the pedal crank is shown.

Figure 3:
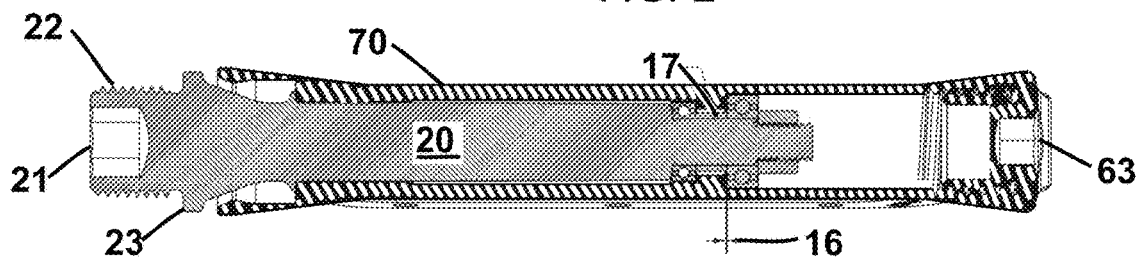
FIG. 3 shows a cross-sectional view of a prior art bicycle pedal.

FIG. 3 shows a cross-sectional view of a prior art bicycle pedal 70. From the outward appearance the prior art pedal has the same hex socket 21 on the threaded end 22 with the flange 23 or shoulder that limits threading the pedal 70 shaft 20 into a crank arm (not shown). The opposing end of the pedal 70 has a hex socket 63 that seals the end of the pedal 70. The prior art design uses a bearing spacer 17 that must be precisely fabricated to minimize the gap 16 to minimize horizontal side-side slack or play movement of the outer pedal 70 on the inner shaft 20. In all conditions spindle shaft 20 must spin freely and the design must be robust enough to prevent damage from side impact.

Figure 4:
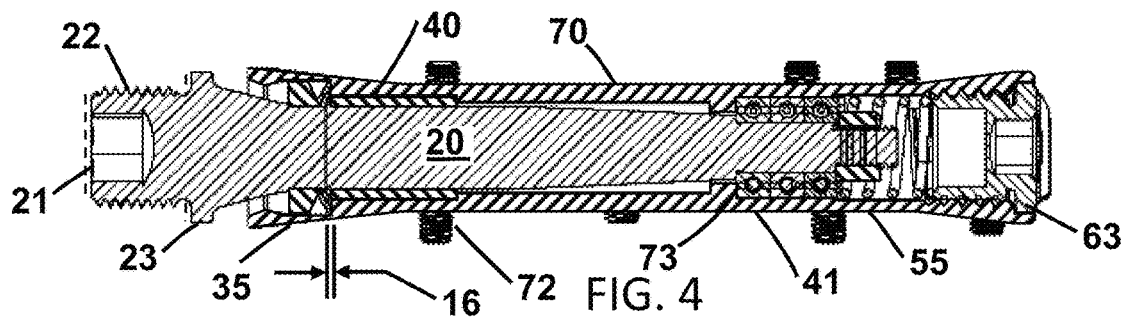
FIG. 4 shows a cross-section of the bicycle pedal taken from section line 4-4 from FIG. 2.

FIG. 4 shows a cross-section of the bicycle pedal 10 taken from section line 4-4 from FIG. 2. This figure shows the internal shaft or spindle 20 within the outer pedal 70 housing. From the left side of this figure the hex socket 21 is shown recessed within the first or threaded end 22. A hex wrench (not shown) is used to tighten the spindle 20 shaft into a bicycle crank (not shown). A shoulder or flange 23 limits how far the spindle 20 is threaded into the crank arm.

At the right side of this view there is a hex socket 63 that is shown covered with a cap. The hex socket threads the cap into the other side of the pedal 70 and compresses a spring 55. Spring 55 presses against one or plurality of ball bearing(s) 41 that are on the spindle 20. Spring 55 biases the bearings 41-43 to maintain the gap 16 at a certain distance so shaft 20 stays at a neutral point during normal operation of the pedal without any side-side movement. While a compression spring 55 is shown and described it is contemplated that an extension spring could be designed to provide a similar result. In this configuration the spindle spins freely and there is no side-to-side slack or play. The high precision bearing spacer in the prior art is not required. There is a first bearing 40 that supports the spindle near shoulder 23 and supported at a second end on said shoulder 72 of the pedal 70 body. An elastomeric seal 35 closes the end of the spindle 20 within the pedal 70. An exploded view in another figure herein shows and describes the assembly in greater detail herein.

Figure 5:
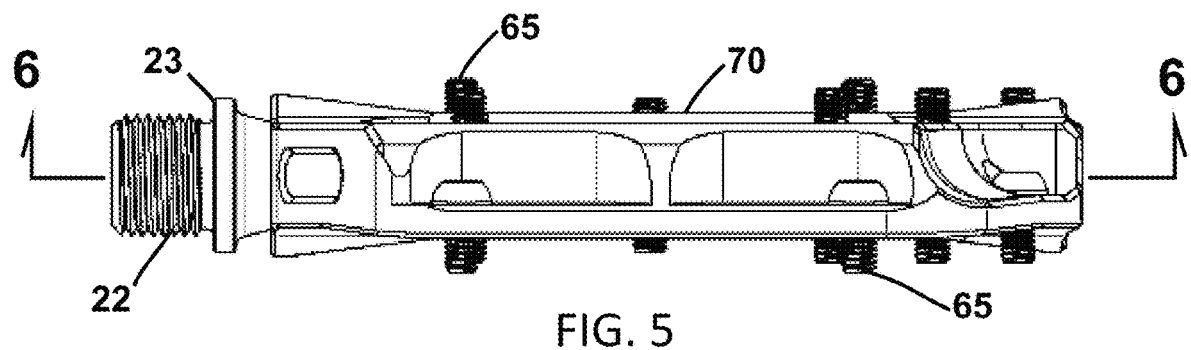
FIG. 5 shows a side view of the bicycle pedal.

FIG. 5 shows a side view of bicycle pedal 70. This figure shows the first threaded end 22 on the left side of the figure with the flange 23 stop. The plurality of fasteners or pins 65 are shown extending from both sides of the pedal 70.

Figure 6:
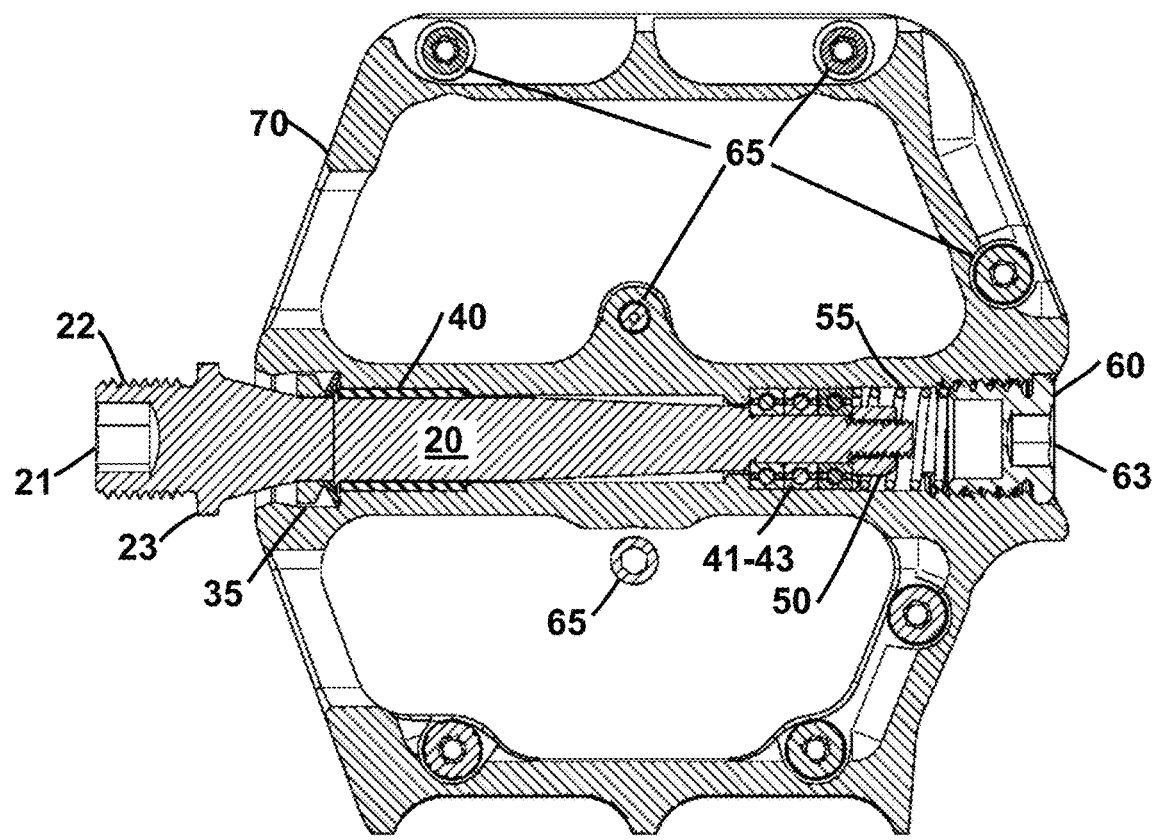
FIG. 6 shows a cross-section of the bicycle pedal taken from section line 6-6 from FIG. 5.

FIG. 6 shows a cross-section of the bicycle pedal 70 taken from section line 6-6 from FIG. 5. In this figure the multiple fasteners or pins 65 pass into or out of the pedal 70. The internal shaft or spindle 20 within the outer pedal 70 housing passes out the left side of the pedal 70. On the left side of the figure hex socket 21 is shown recessed within the first or threaded end 22. A shoulder or flange 23 limits how far the spindle 20 is threaded into the crank arm.

At the right side of this view there is a cap 60 with the hex socket 63 threaded into the pedal 70 and compresses a spring 55. Spring 55 presses against one or plurality of ball bearing(s) 41-43 that are on the spindle 20. Spring 55 biases the at least a second bearing(s) 41-43 to maintain the gap 16 at a certain distance so shaft 20 stays at a neutral point during normal operation of the pedal without any side-side movement. In the preferred embodiment there are three ball bearings 41-43, but it is contemplated that there can be as few as one or two ball bearings, but there could also be more than three ball bearings. It is also contemplated that one or more roller bearings could be used based upon the design and design requirements. A nut 50 compresses the inner race of bearing 41-43 against a shoulder on the spindle 20. The inner race of at least a second bearing 41 is supported on a flange 73. There is a first bearing 40 that supports the spindle near shoulder 73. Elastomeric seal 35 closes the end of the spindle 20 within the pedal 70.

FIG. 7A shows an outside view of the bicycle pedal 70 and FIG. 7B shows an inside view of the bicycle pedal 70. In both figures the fasteners or pins 65 are shown extending out both sides of pedal 70 so the user can place their foot equally on either side of the pedal 70. It is also contemplated that the pins 65 could only exist on one side of the pedal or the pedal could be fabricated with no pins or with a bicycle shoe toe clip. From these figures the crank side shows the hex socket of a common hex wrench size while the outer side of the pedal shows a different hex size for the threaded cap 60.

FIG. 8 shows an exploded view of the internal shaft or spindle 20 and the supporting components, excluding the outer bicycle pedal. Starting at the top, the hex socket 21 side is located with the top portion of the internal shaft or spindle 20 having a threaded end 22 with the shoulder or flange 23 limits how far the spindle 20 is threaded into the crank arm. There is a bearing surface 25 where the first bearing 40 fits on the spindle 20. The bearing can be a self-lubricated bearing such as a bronze bearing or made from an acetal, an ultra high molecular weight (UHMW) material, an oil or a graphite filled material. The bearing will sit between the flange 24 on the spindle and a shoulder in the pedal. In this figure the limiting flange 24 which limits side-side play in the case of side impacts without damaging the bearings 40-43. Only in the case of a side impact on the pedal, shaft 20 with at least a second bearing(s) 41-43 and nut 50 moves together until the limiting flange 24 touches the pedal body.

There is a tapered shaft 26 portion that terminates at a reduced shoulder flange 27. There is a bearing surface 28 where the inside diameter of at least one bearing(s) 41, 42 and 43 rides. Nut 50 compresses the inner race of the bearing(s) 41-43 against the shoulder flange 27. Spring 55 fits around the nut 50 and one end of the spring presses against outer race of the closest ball bearing 43. The nut 50 is threaded onto threads 30 that terminate at a shoulder 29. Spring 55 biases the bearing(s) 41-43 and the spindle 20. This configuration allows the spindle to freely spin and there is no side-to-side slack or play.

The threaded cap 60 has a hex socket 63 with a threaded area 61 that threads into the pedal. Shoulder 62 limits how far the threaded cap 60 can be inserted into the pedal and also sets the compression of the spring 55 to set the amount of force that is used to minimize the previously shown and described gap 16. An elastomeric seal 35 closes the end of the spindle 20 within the pedal. The threaded cap pre-loads the spring and seals the pedal from the environment. An exploded view in another figure herein shows and describes the assembly in greater detail herein.

Thus, specific embodiments of a bicycle pedal have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A bicycle pedal comprising:
a pedal spindle having a threaded shaft end portion that is configured to be attached to a bicycle crank;
a threaded cap end portion that is on an opposite side of the threaded shaft end portion in an axial direction with respect to a rotational center axis of the pedal spindle;
a pedal body having a body part rotatably supported by a first bearing closer to said threaded shaft end portion of said spindle and at least one second bearing in proximity to said threaded cap end portion of said spindle;
said at least one second bearing being secured to said spindle with a fastener;
said threaded cap being configured to compress a first end of a spring;
a second end of said spring being configured to bias an outer race of said at least one second bearing against an internal surface of said pedal body by pressing on an outer race of said at least one second bearing, and
axial movement of said spindle within said pedal body is biased by said spring.

2. The bicycle pedal according to claim 1, wherein there are at least three said at least one second bearing.

3. The bicycle pedal according to claim 1, wherein said at least one second bearing is a ball bearing having an inner race and said outer race.

4. The bicycle pedal according to claim 1, wherein said at least one second bearing is a roller bearing having an inner race and said outer race.

5. The bicycle pedal according to claim 1, wherein said fastener is a nut.

6. The bicycle pedal according to claim 5, wherein said nut is configured to thread onto said threaded end shaft portion of said spindle.

7. The bicycle pedal according to claim 1, further includes an elastomeric seal at said threaded shaft end portion of said spindle.

8. The bicycle pedal according to claim 1, wherein said first bearing is selected from a group consisting of a self-lubricated bearing, a bronze bearing, an acetal bearing and an ultra high molecular weight bearing (UHMW).

9. The bicycle pedal according to claim 8, wherein said first bearing is an oil filled or a graphite filled bearing.

10. The bicycle pedal according to claim 8, wherein an inner race of said first bearing is supported at a first end on a flange on said spindle.

11. The bicycle pedal according to claim 10 wherein said first bearing is supported at a second end on a shoulder in said pedal body.

12. The bicycle pedal according to claim 11, wherein said shoulder in said pedal body is configured to resist said spring bias between said pedal body and said outer race of said at least one second bearing.

13. The bicycle pedal according to claim 1, wherein said pedal body further includes at least one pin that extends out a plainer top or a plainer bottom surface of said pedal body.

14. The bicycle pedal according to claim 13, wherein there is at least a second pin that extends out an opposing planar surface of said pedal body.

15. The bicycle pedal according to claim 13, wherein there are at least 7 said at least one pins.

16. The bicycle pedal according to claim 13, wherein said at least one pin is formed from a threaded fastener.

17. The bicycle pedal according to claim 1, wherein said bicycle pedal has an indicium that indicates what side of a bicycle said crank said pedal spindle is configured to be secured.

18. The bicycle pedal according to claim 17, wherein said first end portion of said spindle has a hex socket.

19. The bicycle pedal according to claim 1, wherein said spring is a compression spring.

20. The bicycle pedal according to claim 1, wherein a length of said threaded cap is selected to determine a compression force of said spring against said outer race of said at least a second bearing.

* * * * *